United States Patent [19]

Gordon

[11] 4,123,408

[45] Oct. 31, 1978

[54] HYDROGEL CONTACT LENS

[75] Inventor: Stanley I. Gordon, Rochester, N.Y.

[73] Assignee: American Optical Corporation, Southbridge, Mass.

[21] Appl. No.: 745,141

[22] Filed: Nov. 26, 1976

[51] Int. Cl.$^2$ .............. C08L 33/08; C08L 33/10; C08L 25/02; G02C 7/04

[52] U.S. Cl. .............. 260/29.6 TA; 260/885; 264/1; 351/160

[58] Field of Search ............ 260/29.6 TA, 885; 526/260, 263, 264, 320; 351/160

[56] References Cited

U.S. PATENT DOCUMENTS

| | | | |
|---|---|---|---|
| 2,948,708 | 8/1960 | Walles et al. | 526/264 |
| 3,390,139 | 6/1968 | de Benneville | 526/264 |
| 3,689,439 | 9/1972 | Field et al. | 526/264 |
| 3,700,761 | 10/1972 | O'Driscoll et al. | 260/885 |
| 3,894,129 | 7/1975 | Hoffman et al. | 260/885 |
| 3,937,680 | 2/1976 | de Carle | 526/264 |
| 3,966,847 | 6/1976 | Seiderman | 260/885 |
| 3,978,164 | 8/1976 | Le Boeuf et al. | 260/885 |
| 3,983,083 | 9/1976 | Kaetsu et al. | 526/320 |

*Primary Examiner*—Harry Wong, Jr.
*Attorney, Agent, or Firm*—Pollock, Vande Sande & Priddy

[57] ABSTRACT

Contact lens of a hydrogel composition containing a physiologically acceptable aqueous solution and water-insoluble but water-swellable polymer composition from:

(A) a water-soluble polymer of a heterocyclic N-vinyl polymerizable compound containing carbonyl functionality adjacent to nitrogen in the ring; and (B) a polymerizable mixture containing:
 (1) polymerizable monoester of acrylic and/or methacrylic acid and polyhydric alcohol;
 (2) an alkyl acrylate and/or alkyl methacrylate and/or vinyl ester;
 (3) divinyl benzene and/or divinyl toluene.

15 Claims, No Drawings

HYDROGEL CONTACT LENS

BACKGROUND OF THE INVENTION

The present invention is concerned with novel hydrogel contact lenses having excellent physical and optical properties and which can be worn in the eye with a minimum degree of discomfort or irritation, and with the polymer compositions for preparing the lenses.

In the last few years, considerable attention has been directed to obtaining hydrogels of polymer compositions which are suitable for fabricating contact lenses.

For example, U.S. Pat. No. 3,532,679 to Steckler discloses hydrogel materials, which according to the patentee, form suitable contact lenses. Such hydrogels are obtained from certain relative amounts of a heterocyclic N-vinyl monomer containing a carbonyl functionality adjacent to the nitrogen in the heterocyclic ring such as N-vinyl-2-pyrrolidone, a vinyl ester or an acrylate ester, and a polyethylene glycol dimethacrylate cross-linking agent. According to Steckler, it is necessary to employ a polyethylene glycol dimethacrylate cross-linking agent in order to obtain hydrogels which have properties suitable for use as a contact lens. Moreover, Steckler indicates that much of the previous work with respect to hydrogels suitable for contact lenses was done employing either ethylene glycol dimethyacrylate or polyethylene glycol dimethacrylate cross-linking agents. For instance, U.S. Pat. Nos. 2,976,576 and 3,220,960 to Otto Wichterle et al and an article by M. F. Refojo et al in the Journal of Applied Polymer Science, Volume 9, pages 2425-35 (1965) describe various hydrogel polymers including those employing an ethylene glycol dimethacrylate cross-linking agent for producing a hydrogel.

In addition, Seiderman in U.S. Pat. Nos. 3,639,524, 3,721,657, 3,767,731, and 3,792,028 suggests obtaining hydrogels from certain polymer compositions of polyvinyl pyrrolidone wherein the suggested cross-linking agents are diesters of the type discussed by Steckler and Wichterle et al or are certain acids.

British Patent No. 1,391,438 also suggests obtaining hydrogels from certain polymer compositions of N-vinyl-2-pyrrolidone wherein the cross-linking agent can be an alkylene glycol dimethacrylate (e.g., ethylene glycol dimethacrylate), divinyl benzene, diethylene glycol bis-(alkyl carbonate), or alkyl methacrylate. Although divinyl benzene is suggested as a cross-linking agent in certain of the polymers, there is no explicit disclosure of using divinyl benzene in a contact lens. In fact, those compositions (Examples 7-10) suggested by the British patent for preparing contact lenses do not employ divinyl benzene. Moreover, those examples (Examples 1 and 2) which suggest divinyl benzene produced products which were "slightly distorted." Accordingly, such examples would not be suitable for preparing contact lenses because distortion cannot be tolerated in a contact lens. It is further noted that since the British patent No. 1,391,438 does not suggest any preference for divinyl benzene as a cross-linking agent, the use of such rather than an alkylene glycol dimethacrylate particularly when the polymer is obtained from a mixture which includes the corresponding alkylene glycol monoester is not clearly suggested. Such monoesters as obtained commercially contain a significant amount of diester. There is no incentive suggested in the British patent to employ the additional procedures, as applicant's have, to remove as much of the diester from the monoester as is practical. Consistent with this is the fact that those compositions of the British patent which suggests an alkylene glycol monoester (Examples 11 and 12) employ the corresponding diester, as a cross-linking agent.

O'Driscoll et al, for example, in U.S. Pat. No. 3,700,761 also suggest fabricating contact lens blanks from certain hydrogen compositions obtained from polyvinyl pyrrolidone, monoester of certain glycols such as hydroxyethyl methacrylate, and no more than about 0.2% by weight of a dimethacrylate. O'Driscoll et al emphasize the extreme importance of selecting the proper constituents and correct relative amounts of each for the fabrication of contact lenses. This criticality of constituents and their relative proportions for fabricating hydrogel contact lenses, which must possess a number of optical and physical characteristics, is discussed by Grucza in U.S. Pat. No. 3,807,398.

In addition to the necessary physical properties, hydrogel materials to be suitable for contact lenses must possess a number of important optical properties. For instance, the hydrogel must be transparent, colorless, and have a uniform refractive index. The material to be employed as a lens, when hydrated, should be capable of retaining the configuration of its optical surface for a relatively long period of time. Moreover, a lens obtained from a hydrogel material should be capable of retaining its optical characteristics when placed upon the eye. Furthermore, the desired shape should be retained without distortion, when going from the unhydrated state to the hydrated state. Also, the hydrogel material should be stable in the presence of light during its lifetime.

A lens material should also be permeable to tear fluid since drying of the outside surface of the lens may tend to cause fogging, which in turn impairs vision.

Therefore, an object of the present invention is to provide a polymer composition, useful for contact lenses, possessing the above-discussed combination of important properties.

It has been found according to the present invention that contact lenses can be obtained from hydrogels wherein the polymer is from:

(A) a water-soluble polymer of a heterocyclic N-vinyl polymerizable compound containing carbonyl functionality adjacent to nitrogen in the ring; and (B) a polymerizable mixture containing:
 (1) polymerizable monoester of acrylic and/or methacrylic acid and polyhydric alcohol;
 (2) an alkyl acrylate and/or alkyl methacrylate and/or vinyl ester; and
 (3) as cross-linking agent, divinyl benzene and/or divinyl toluene.

The ability to use divinyl benzene and/or divinyl toluene along with the other materials required by the present invention as a cross-linking agent for a hydrogen contact lens is quite surprising in view of the prior suggestions in the art concerning cross-linking agents for hydrogel contact lenses. For instance, even though Wichterle et al recognized that divinyl benzene was a cross-linking agent (i.e., see column 1, line 22, of U.S. Pat. No. 3,220,960). they did not suggest that divinyl benzene could be employed when preparing contact lenses. This failure to recognize divinyl benzene as being a suitable cross-linking agent in fabricating contact lens is especially evident by the disclosures of Shepherd and Gould. In particular, Shepherd and Gould, in U.S. Pat. No. 3,577,512, which is concerned with sustained release tablets and not contact lenses, suggest employing divinyl benzene or divinyl toluene, as well as the above-discussed diesters, in certain hydrogel polymeric compositions (e.g., see column 3, lines 12 and 13, and Example 21). On the other hand, Shepherd and Gould in U.S. Pat. No. 3,520,949 discuss contact lenses (column 3, line 14) but only suggest polyfunctional monomeric esters such as ethylene glycol dimethacrylate as the cross-linker (column 3, lines 24–27) and do not suggest divinyl benzene.

In U.S. Pat. No. 3,728,317, although Blank suggested divinyl benzene as a cross-linking agent in polymers vastly different from those of the present invention (e.g., polymers from methyl methacrylate and acrylic acid), the products produced were apparently somewhat hard (see Example 4). In fact, subsequently, Blank et al found that cross-linkers such as divinyl benzene yielded a hard product unsuitable for introduction into the eye (U.S. Pat. No. 3,927,206, column 1, line 61, to column 2, line 7).

However, contrary to the above-mentioned prior art indications, it has not only been found possible, but desirable, to exclude diesters as cross-linking agent for fabricating hydrogel contact lenses and to use divinyl benzene and/or divinyl toluene along with the other materials required by the present invention. The use of divinyl benzene and/or divinyl toluene is advantageous since all commercially available hydroxyethyl methacrylate contains some amount of diester (ethylene glycol dimethacrylate), which at best is very difficult to measure. The removal of the diester, and the addition to the polymerization mixture of known quantity of divinyl benzene and/or divinyl toluene ensures a more reproducible polymerization from reaction batch to reaction batch. Another advantage to the use of divinyl benzene is that it is more efficient as a cross-linking linking agent in combination with the other materials in the polymerizable mixture than is, for example, ethylene glycol dimethacrylate. This in turn permits the addition of smaller amounts of divinyl benzene and/or divinyl toluene compared to diester, thus yielding lenses which are more hydrophilic yet still retain the property of high burst strength. Still another advantage to the use of divinyl benzene and/or divinyl toluene is that the final product has greater strength and is more resilient when compared to a product employing a diester such as ethylene glycol dimethacrylate as the cross-linker. This is believed at least in part to be due to the reduced distance between cross-linked chains.

Moreover, the hydrogel compositions of the present invention are quite flexible and elastic.

Some other patents of interest which discuss contact lens materials are U.S. Pat. No. 3,621,079 to Leeds, U.S. Pat. No. 3,647,736 to Ewell, and U.S. Pat. No. 3,503,942 to Seiderman. Also, the criticality and difficulty in selecting the proper cross-linking agent in conjunction with other constituents is evidenced by U.S. Pat. Nos. 3,787,380, 3,758,448, and 3,772,235 to Stamberger.

SUMMARY OF THE INVENTION

The present invention is related to a shaped contact lens of concavo-convex shape with the concave surface substantially conforming to the cornea of the eye, said lens being formed of a hydrogel composition consisting essentially of:

(A) a polymerized water-insoluble but water-swellable polymer composition from:
  (1) a water-soluble polymer of a heterocyclic N-vinyl polymerizable compound containing at least one nitrogen atom in the ring, and a carbonyl functionality adjacent to a nitrogen in the heterocyclic ring; and
  (2) a polymerizable mixture consisting essentially of:
    (a) polymerizable monoester of an acid selected from the group consisting of acrylic and methacrylic acid and mixtures thereof; and a polyhydric alcohol;
    (b) monoethylenically unsaturated esters selected from the group consisting of alkyl acrylates, alkyl methacrylates, vinyl esters of saturated monocarboxylic acids of up to 22 carbon atoms, and mixtures thereof; wherein the alkyl group of said methacrylate or acrylate contains from 1 to 22 carbon atoms; and
    (c) divinyl benzene and/or divinyl toluene; wherein the relative amounts of (A) (1), (A) (2) (a), (A) (2) (b), and (A) (2) (c) are from about 5 to about 40% by weight of (A) (1); from about 93.8 to to about 51.8% by weight of (A) (2) (a); from about 1 to about 6% by weight of (A) (2) (b); and from about 0.2 to about 2.2% by weight of (A) (2) (c) based upon the total weight of (A) (1), (A) (2) (a), (A) (2) (b), and (A) (2) (c) employed; and
(B) physiologically acceptable aqueous solution; wherein said hydrogel contains from about 30 to about 80% by weight of (A) based upon the total weight of (A) and (B), and from about 20 to about 70% by weight of (B) based upon the total weight of (A) and (B).

The present invention is also concerned with the polymerized water-insoluble but water-swellable polymer composition described hereinabove for preparing shaped hydrogen contact lenses.

DESCRIPTION OF PREFERRED EMBODIMENTS

The water-insoluble polymers (A) (1) which are suitable in obtaining the polymers of the present invention are from water-soluble polymerizable monomers which must contain a carbonyl functionality adjacent to a nitrogen in the heterocyclic ring. In addition, such monomers must contain a vinyl group bonded to this nitrogen atom of the heterocyclic ring, and should be capable of homopolymerizing to a water-soluble material.

Examples of such suitable heterocyclic monomers containing a carbonyl functionality adjacent to the nitrogen in the heterocyclic ring and containing a vinyl group pendant from a nitrogen in the heterocyclic ring include the vinyl lactams,

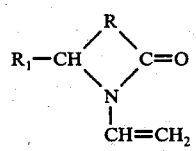

wherein R represents an alkylene bridge group of 2 to 4 carbon atoms and $R_1$ represents a member selected from the group of hydrogen, alkyl, aryl, aralkyl, and alkaryl groups and preferably hydrogen or a lower alkyl group such as methyl, ethyl, or propyl. Other heterocyclic monomers which can be employed in the preparation of the water-soluble polymers (A) (1) include N-vinyl imidazolidone, N-vinyl succinimide, N-vinyl diglycolylimide, N-vinyl glutarimide, N-vinyl-3-morpholinone, N-vinyl-5-methyl-3-morpholinone. The heterocyclic monomers for obtaining the water-soluble polymers (A) (1) generally contain from about 3-6 carbon atoms in the heterocyclic ring and usually are 5 to 7 membered heterocyclic ring systems.

Some N-vinyl lactams falling within the above structural formula include N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-piperidone, N-vinyl-4-methyl-2-caprolactam, N-vinyl-5-methyl-2-pyrrolidone, N-vinyl-5-methyl-2-piperidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, and N-vinyl-3,5,7-trimethyl-2-caprolactam. Mixtures of the above can be used when desired in providing the water-soluble polymer (A) (1).

In addition, up to about 20% by weight of comonomers such as vinyl acetate, vinyl proprionate, other vinyl esters of organic acids, acrylamide, acrylonitrile, acrylic acid, methyl acrylate, methacrylamide, maleic anhydride, styrene, vinyl chloride, vinyl methyl ketone, vinyl methyl ether, N-vinyl succinimide, and N-vinyl phthalimide can be present in said water-soluble polymers.

The preferred water-soluble nitrogen polymer is polyvinyl pyrrolidone. Polyvinyl pyrrolidone is a water-soluble polymer and is commercially available as white powders ranging in molecular weight from about 10,000 to about 400,000. The preferred molecular weight of the polyvinyl pyrrolidone is from about 30,000 to about 100,000.

The amount of water-soluble polymer of the heterocyclic monomer is from about 5 to about 40% by weight and preferably about 10 to about 30% by weight.

The polymerizable monoesters (A) (2) (a) which are suitable in obtaining the polymers of the present invention must be water-soluble and should be capable of homopolymerizing to a water-soluble material. Such polymerizable monoesters are monoesters of either acrylic and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethylene glycol and polypropylene glycol; 1,6-hexamethylene glycol; and 1,4-butanediol. Some suitable polyhydric alcohols which contain from 3 to 6 alcohol groups and which may be employed to form the ester used in the present invention include glycerol, trimethylol propane, trimethylolethane, pentaerythritol, and hexitols such as mannitol and sorbitol. Examples of some suitable polymerizable monoesters include hydroxy ethyl methacrylate, hydroxy ethyl acrylate, hydroxy propyl methacrylate, diethylene glycol monomethacrylate, diethylene glycol monoacrylate, glyceryl methacrylate, and pentaerythritol methacrylate, with the preferred polymerizable monoester being hydroxy ethyl methacrylate.

The monoester must be substantially free of diester (e.g., less than 0.05% by weight of diester). However, normally the monoesters obtained commercially contain a significant amount of diesters. For instance, up to about 1% of ethylene glycol dimethacrylate is found in most commercial grades of hydroxyethyl methacrylate. One procedure to obtain the necessary degree of purity of a monoester such as hydroxyethyl methacrylate is by multiple fractional vacuum distillations at a pressure below 1 mm of mercury. The amount of said monoester employed is usually between about 93.8 and about 51.8% by weight and preferably between about 63.8 to about 87.8% by weight.

The monoethylenically unsaturated esters (A) (2) (b) which may be employed in preparing the polymers of the present invention include the alkyl methacrylates, the alkyl acrylates, the vinyl esters of saturated monocarboxylic acids and mixtures thereof.

Usually the alkyl radical of the methacrylate or acrylate contains up to 22 carbon atoms, and preferably contains from 1 to 5 carbon atoms. Some examples of methacrylates suitable for use in the present invention include methyl methacrylate, ethyl methacrylate, isopropyl methacrylate, butyl methacrylate, capryl methacrylate, palmityl methacrylate, stearyl methacrylate, and lauryl methacrylate. Some suitable acrylate esters include ethyl acrylate, methyl acrylate, isopropyl acrylate, butyl acrylate, and lauryl acrylate.

The vinyl esters suitable in the present invention include the vinyl esters of monocarboxylic acids wherein the acid contains up to about 22 carbon atoms. Some suitable vinyl esters include vinyl acetate, vinyl propionate, vinyl butyrate, vinyl stearate, and the vinyl ester of "Versatic" 911 acid which is a saturated synthetic tertiary monocarboxylic acid having $C_9$, $C_{10}$, and $C_{11}$ chain length. The most preferred vinyl ester is vinyl acetate.

The preferred unsaturated esters employed in the present invention are the methacrylates of which the most preferred is methyl methacrylate. The amount of monoethylenically unsaturated ester is about 1 to about 6% by weight, and preferably about 2 to about 4% by weight.

The cross-linking agent (A) (2) (c) employed according to the present invention is divinyl benzene and/or divinyl toluene, and preferably is divinyl benzene. In some instances, it may be desirable to treat the divinyl benzene and divinyl toluene to further purify it such as by distillation to reduce the amount of such materials as ethyl benzene, ethylvinyl benzene, diethyl benzene, and naphthalene which may be present in certain commercially available divinyl benzene or divinyl toluene. Distillations at pressures below about 1 mm of Hg and temperatures below about 80° C. are quite suitable for this purpose. The amount of cross-linking agent is from about 0.2 to about 2.2% by weight, and preferably from about 0.2 to about 1.2% by weight.

The hydrogels according to the present invention generally contain from about 30 to about 80% by weight of the polymer and from about 70 to about 20% by weight of the aqueous solution based upon the total weight of the polymer and aqueous solution. When employing the preferred polymers disclosed herein, the hydrogels usually contain from about 40 to about 70% by weight of the polymer and from about 60 to about 30% by weight of the aqueous solution based upon the total weight of the polymer and aqueous solution. The aqueous solution is preferably physiological saline solution (0.9% NaCl).

The lenses of the present invention can also contain pharmacological agent for treatment of the eye, when desired. Some pharmacological agents include chlorhexidine, pilocarpine, belladonna alkaloids, dibenzyline, hydergine, methacholine, carbachol, and bethanechol.

The polymers employed according to the present invention are preferably prepared employing bulk polymerization techniques.

The polymerization catalyst employed can be any of the catalysts which are suitable in polymerizing compounds containing ethylenic unsaturation, and preferably are the free radical catalysts. Of particular interest are the peroxide catalysts. Some examples of suitable peroxide catalysts include hydrogen peroxide, benzoyl peroxide, tert-butyl peroctoate, phthalic peroxide, succinic peroxide, benzoyl acetic peroxide, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)butane, hydroxyheptyl peroxide, and diperoxide of benzaldehyde, di(sec-butyl) peroxydicarbonate, t-butyl peroxypivate, di(2-ethylhexyl)peroxy-dicarbonate and di-n-propyl peroxydicarbonate, and the like. The preferred catalyst is one which is effective at moderately low temperature such as at about 20°–80° C., such as tert-butyl peroctoate, benzoyl peroxide, and di(sec-butyl)peroxydicarbonate.

The polymerization is generally carried out at temperatures from about room temperature to about 150° C. It is generally preferred to initiate the polymerization at relatively low temperatures such as from about 20° to about 85° C. The most preferred initial temperature range of polymerization is between about 25° and 70° C.

Usually the polymerization is conducted under autogenous pressure in a closed reaction vessel. However, any suitable means to prevent significant evaporation of any of the monomers can be employed.

Generally, the polymerization is completed in about 1 to about 24 hours and preferably is completed in about 2 to 12 hours. It is understood, of course, that the time and temperature are inversely related. That is, temperature employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed in the post cure will range from about 90° to about 150° C. Five hours is usually more than sufficient for such a post curing operation. Preferably the post cure is completed in 1–3 hours. The lenses may be cast directly or the polymerization may be carried out in a mold in a shape that is convenient for further processing of the polymerized material such as in the shape of small cylinders referred to in the art as "buttons." The polymerization vessel or mold is generally prepared from a material inert to the constituents of the polymerization mixture and product, and whose surface will permit easy removal of the polymer. Examples of such materials include glass, polypropylene, silicone rubber, polyvinylchloride, and polytetrafluoroethylene.

After the polymerization, the polymer can be machined into lens shapes. The polymer can then be contacted with an aqueous solution in order to obtain the hydrogel materials. During this step, $H_2O$ soluble materials, if present, will leach out. The hydrated shapes can be rinsed and can then be employed as contact lenses.

After the polymerization is completed, including any post curing, a firm, rigid, and clear copolymer is obtained. The polymers of the present invention possess other important characteristics such as having excellent machineability and polishing characteristics.

The hydrogels obtained from the polymers of the present invention are clear, resilient and exhibit good bursting strength. Also the hydrogels are elastic and flexible. Moreover, they possess the necessary optical properties essential for contact lenses.

In order to better understand the present invention, the following example is given wherein all parts are by weight unless the contrary is stated.

EXAMPLE

To about 105 grams (15% of polymerization mixture) of polyvinyl pyrrolidone and about 560 grams (80% of polymerization mixture) of purified 2-hydroxyethyl methacrylate are admixed about 35 grams (5% of polymerization mixture) of methyl methacrylate; after which about 3.82 grams (0.3% of polymerization mixture) of purified divinyl benzene is admixed. Next about 2.8 grams (0.4% of polymerization mixture) of t-butyl peroctoate as catalyst is added and admixed therewith.

The polyvinylpyrrolidone employed is commercially available under the trade designation Plasdone K-29-32 which according to the manufacturer has a K-value range of 29–32 wherein K-value is a function of mean molecular weight and K-30 is equivalent to 40,000.

The hydroxyethyl methacrylate is available from Alcolac Chemical Company under the trade designation HEMA-HP. The hydroxyethyl methacrylate is purified by vacuum distillation at pressure of about 0.6 mm of Hg using a 45 cm length distilling column. The pot temperature during the distillation is about 77° C. and the vapor temperature is about 68° C. The first 15% by weight fore-run is collected and discarded. The next fraction which is about 70% by weight is collected as the purified 2-hydroxyethyl methacrylate and the residue in the pot is discarded. The purification process is for removing diester. The process also removes methoxyphenol stabilizer which is usually present in amounts of about 1,000 ppm in the material from Alcolac Chemical Company.

The divinyl benzene is available from Dow Chemical Company under the trade designation Divinyl Benzene-55. The divinyl benzene is purified by distillation through a 45 cm long distilling column filled with helipak at pressure of about 0.1 mm of Hg. The pot temperature of the distillation was about 65° C. and the vapor temperature was about 45° C. A fore-run of about 30% by weight is collected and discarded. The next fraction which is about 50% by weight is collected and reserved for use in polymerization. The pot residue is discarded.

The methyl methacrylate (methyl methacrylate uninhibited from Rohm and Haas) and t-butyl peroctoate are used as obtained without further purification.

The polymerization mixture is stirred to provide a uniform mixture. The polymerization mixture is then poured into a plurality of stationary circular molds, each mold of which contained about 0.8 grams of the polymerization mixture.

The molds are placed in an oven. The molds are heated to about 80° C. and maintained thereat for about 12 hours.

The molds are removed from the oven and cooled. Then the polymerized "buttons" which are in the shape of small cylinders are removed from the molds. The polymerized "buttons" are clear and hard solids. The polymerized "buttons" are then placed on a marked aluminum tray and are placed in an oven at 100°±10° C. for approximately two hours for a "post-cure" to assure completion of the polymerization and to release any stress which might have developed during polymerization.

After the polymerization is completed, a clear, firm and rigid polymer is obtained. The polymerized material is then placed on a conventional contact lens lathe such as one obtainable from Hardinge Brothers, Elmira, New York, and then is ground and polished. The polymer has excellent machining and polishing characteristics. It is then contacted with physiological saline solution until it is in a state of osmotic equilibrium with the physiological saline solution to produce the desired hydrogel contact lens.

The hydrogel lenses obtained are clear, flexible, and elastic, have excellent optical properties, and have a water content of about 42% at osmotic equilibrium. The hydrogel lenses have an index of refraction of about 1.43 and linear expansion of about 22.8%. The polymerized material has a hardness of 85 Durometer (type D). The polymerized material in the nonhydrated form has an index of refraction of about 1.51.

What is claimed is:

1. A shaped transparent contact lens of concave-convex shape with the concave surface substantially conforming to the cornea of the eye, said lens being formed of a hydrogel composition consisting essentially of:
    (A) a polymerized water-insoluble but water-swellable polymer composition from:
        (1) a water-soluble polymer of a heterocyclic N-vinyl polymerizable compounds containing at least one nitrogen atom in the ring, and a carbonyl functionality adjacent to a nitrogen in the heterocyclic ring and being selected from the group consisting of vinyl lactams having the formula:

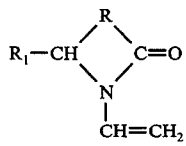

wherein R represents an alkylene bridge group of 2 to 4 carbon atoms and $R_1$ represents a member selected from the group of hydrogen, alkyl, aryl, aralkyl, and alkaryl groups; N-vinyl imidazolidone, N-vinyl succinimide, N-vinyl diglycolylimide, N-vinyl glutarimide, N-vinyl-3-morpholinone, and N-vinyl-5-methyl-3-morpholinone; and
        (2) a polymerizable mixture consisting essentially of:
            (a) polymerizable monoester of an acid selected from the group consisting of acrylic acid, methacrylic acid, and mixtures thereof; and a polyhydric alcohol having 2 to 6 alcohol groups and being selected from the group consisting of ethylene glycol, 1,3-propanediol, a dialkylene glycol, a polyalkylene glycol, 1,6-hexamethylene glycol, 1,4-butanediol, glycerol, trimethylol propane, trimethylolethane, pentaerythritol, mannitol, and sorbitol;
            (b) monoethylenically unsaturated esters selected from the group consisting of alkyl acrylates, alkyl methacrylates, vinyl esters of saturated monocarboxylic acids of up to 22 carbon atoms, and mixtures thereof; wherein the alkyl groups of said methacrylate or acrylate contain from 1 to 22 carbon atoms; and
            (c) a divinyl compound selected from the group consisting of divinyl benzene, divinyl toluene, and mixtures thereof;
    wherein the relative amounts of (A) (1), (A) (2) (a), (A) (2) (b), and (A) (2) (c) are from about 5 to about 40% by weight of (A) (1), from about 93.8% to about 51.8% by weight of (A) (2) (a), from about 1 to about 6% by weight of (A) (2) (b), and from about 0.2 to about 2.2% by weight of (A) (2) (c) based upon the total weight of (A) (1), (A) (2) (a), (A) (2) (b), and (A) (2) (c); and
    (B) physiologically acceptable aqueous solution; wherein said hydrogel contains from about 30 to about 80% by weight of (A) based upon the total weight of (A) and (B), and from about 20 to about 70% by weight of (B) based upon the total weight of (A) and (B).

2. The contact lens of claim 1 wherein said water-soluble polymer is polyvinylpyrrolidone.

3. The contact lens of claim 1 wherein said vinyl lactam is selected from the group consisting of N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-piperidone, N-vinyl-4-methyl-2-caprolactam, N-vinyl-5-methyl-2-pyrrolidone, N-vinyl-5-methyl-2-piperidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, and mixtures thereof.

4. The contact lens of claim 1 wherein said polymerizable monoester (A) (2) (a) is selected from the group consisting of hydroxyethyl methacrylate, hydroxyethyl acrylate, hydroxypropyl methacrylate, diethylene glycol monomethacrylate, diethylene glycol monoacrylate, glyceryl methacrylate, pentaerythritol methacrylate, and mixtures thereof.

5. The contact lens of claim 1 wherein said polymerizable monoester (A) (2) (a) is hydroxy ethyl methacrylate.

6. The contact lens of claim 1 wherein said monoethylenically unsaturated ester is selected from the group consisting of methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, lauryl acrylate, vinyl acetate, vinyl propionate, vinyl butyrate, vinyl stearate, and the vinyl ester of a saturated synthetic tertiary monocarboxylic acid having $C_9$, $C_{10}$, and $C_{11}$ chain length.

7. The contact lens of claim 1 wherein said monoethylenically unsaturated ester is methyl methacrylate.

8. The contact lens of claim 1 wherein said monoethylenically unsaturated ester is vinyl acetate.

9. The contact lens of claim 1 wherein said divinyl compound is divinyl benzene.

10. The contact lens of claim 1 wherein said water-soluble polymer (A) (1) is polyvinyl pyrrolidone; said polymerizable monoester (A) (2) (a) is hydroxyethyl methacrylate; said monoethylenically unsaturated ester (A) (2) (b) is methyl methacrylate; and said divinyl compound (A) (2) (c) is divinyl benzene.

11. The contact lens of claim 1 wherein the relative amounts of (A) (1), (A) (2) (a), (A) (2) (b), and (A) (2) (c) are from about 10 to about 30% by weight of (A) (1), from about 63.8 to about 87.8% by weight of (A) (2) (a), from about 2 to about 4% by weight of (A) (2) (b), and from about 0.2 to about 1.2% by weight of (A) (2) (c).

12. The contact lens of claim 1 wherein said water-soluble polymer (A) (1) is polyvinyl pyrrolidone; said polymerizable monoester (A) (2) (a) is hydroxyethyl methacrylate; said monoethylenically unsaturated ester (A) (2) (b) is methyl methacrylate; and said divinyl compound (A) (2) (c) is divinyl benzene, and wherein the relative amounts of (A) (1), (A) (2) (a), (A) (2) (b), and (A) (2) (c) are from about 10 to about 30% by weight of (A) (1), from about 63.8 to about 87.8% by weight of (A) (2) (a), from about 2 to about 4% by weight of (A) (2) (b), and from about 0.2 to about 1.2% by weight of (A) (2) (c).

13. A shaped transparent contact lens of concave-convex shape with the concave surface substantially conforming to the cornea of the eye and having an index of refraction of about 1.43, a hardness of 85 durometer (type D), an index of refraction in the nonhydrated state of about 1.51, a linear expansion of about 22.8% and being formed of a hydrogel composition consisting essentially of:
 (A) a polymer formed from:
  (1) polyvinylpyrrolidone; and
  (2) a polymerizable mixture consisting essentially of:
   (a) hydroxyethyl methacrylate;
   (b) methyl methacrylate; and
   (c) divinyl benzene;
 wherein the relative amounts of (A) (1), (A) (2) (a), (A) (2) (b), and (A) (2) (c) are from about 5 to about 40% by weight of (A) (1), from about 93.8% to about 51.8% by weight of (A) (2) (a), from about 1 to about 6% by weight of (A) (2) (b), and from about 0.2 to about 2.2% by weight of (A) (2) (c) based upon the total weight of (A) (1), (A) (2) (a), (A) (2) (b), and (A) (2) (c); and
 (B) physiologically acceptable aqueous solution; wherein said hydrogel contains from about 30 to about 80% by weight of (A) based upon the total weight of (A) and (B), and from about 20 to about 70% by weight of (B) based upon the total weight of (A) and (B).

14. The contact lens of claim 13 wherein the relative amounts of (A) (1), (A) (2) (a), (A) (2) (b), and (A) (2) (c) are from about 10 to about 30% by weight of (A) (1), from about 63.8 to about 87.8% by weight of (A) (2) (a), from about 2 to about 4% by weight of (A) (2) (b), and from about 0.2 to about 1.2% by weight of (A) (2) (c).

15. A process for preparing a shaped transparent contact lens of concave-convex shape with the concave surface substantially conforming to the cornea of the eye, which comprises:
 (A) providing a composition consisting essentially of:
  (1) a water-soluble polymer of a heterocyclic N-vinyl polymerizable compound containing at least one nitrogen atom in the ring, and a carbonyl functionality adjacent to a nitrogen in the heterocyclic ring and being selected from the group consisting of vinyl lactams having the formula:

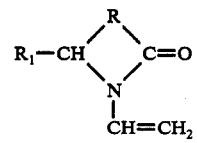

wherein R represents an alkylene bridge group of 2 to 4 carbon atoms and $R_1$ represents a member selected from the group of hydrogen, alkyl, aryl, aralkyl, and alkaryl groups; N-vinyl imidazolidone, N-vinyl succinimide, N-vinyl diglycolylimide, N-vinyl glutarimide, N-vinyl-3-morpholinone, and N-vinyl-5-methyl-3-morpholinone; and
  (2) a polymerizable mixture consisting essentially of:
   (a) polymerizable monoester of an acid selected from the group consisting of acrylic acid, methacrylic acid, and mixtures thereof; and a polyhydric alcohol having 2 to 6 alcohol groups and being selected from the group consisting of ethylene glycol, 1,3-propanediol, a dialkylene glycol, a polyalkylene glycol, 1,6-hexamethylene glycol, 1,4-butanediol, glycerol, trimethylol propane, trimethylolethane, pentaerythritol, mannitol, and sorbitol;
   (b) monoethylenically unsaturated esters selected from the group consisting of alkyl acrylates, alkyl methacrylates, vinyl esters of saturated monocarboxylic acids of up to 22 carbon atoms, and mixtures thereof; wherein the alkyl groups of said methacrylate or acrylate contain from 1 to 22 carbon atoms;
   (c) a divinyl compound selected from the group consisting of divinyl benzene, divinyl toluene, and mixtures thereof;
 wherein the relative amounts of (A) (1), (A) (2) (a), (A) (2) (b), and (A) (2) (c) are from about 5 to about 40% by weight of (A) (1), from about 93.8% to about 51.8% by weight of (A) (2) (a), from about 1 to about 6% by weight of (A) (2) (b), and from about 0.2 to about 2.2% by weight of (A) (2) (c) based upon the total weight of (A) (1), (A) (2) (a), (A) (2) (b), and (A) (2) (c);
 (B) placing said polymerizable mixture in a reaction vessel which is of a shape convenient for further processing of the material;
 (C) causing said mixture to polymerize into a firm, rigid, and transparent polymer;
 (D) machining the polymer into the shape of a contact lens having a concave-convex shape with the concave surface substantially conforming to the cornea of the eye; and (E) contacting the shaped polymer with a physiologically acceptable aqueous solution;

(F) permitting said shaped polymer to reach a state of osmotic equilibrium with said aqueous solution to thereby provide said contact lens containing from about 30 to about 80% by weight of (A) based upon the total weight of (A) and (B) and from about 20 to about 70% by weight of (B) based upon the total weight of (A) and (B).

* * * * *